F. D. KASER.
AUTOMATIC BRAKE FOR VEHICLES.
APPLICATION FILED JULY 17, 1908.
931,430.
Patented Aug. 17, 1909.
2 SHEETS—SHEET 1.
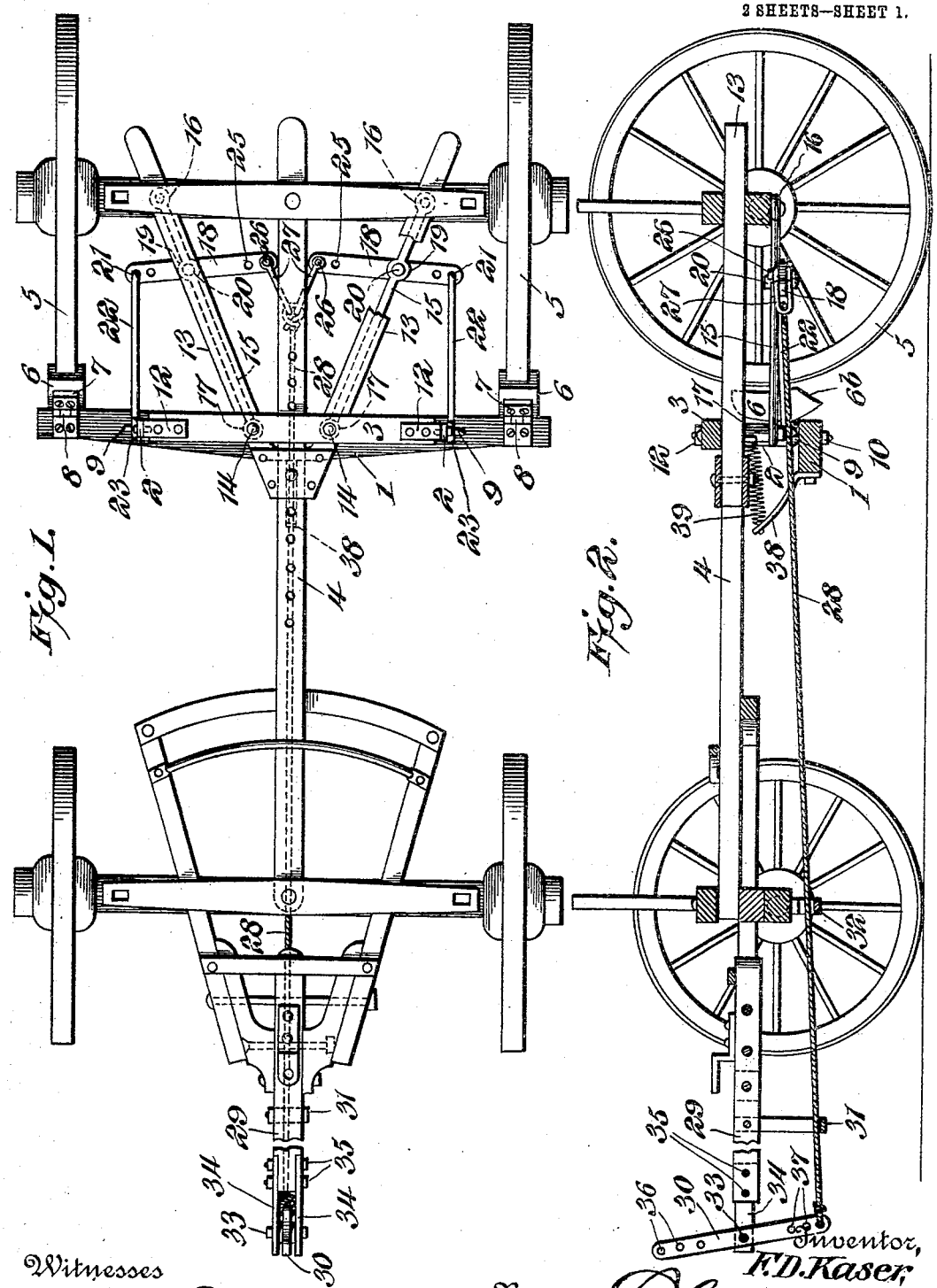

F. D. KASER.
AUTOMATIC BRAKE FOR VEHICLES.
APPLICATION FILED JULY 17, 1908.
931,430.
Patented Aug. 17, 1909.
2 SHEETS—SHEET 2.
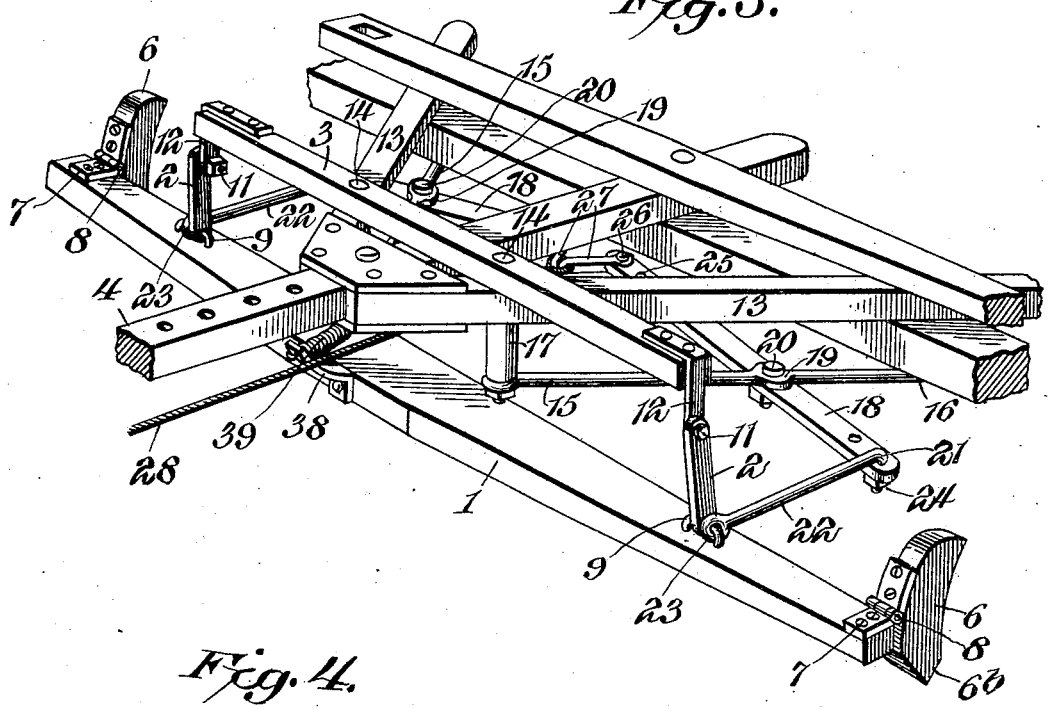
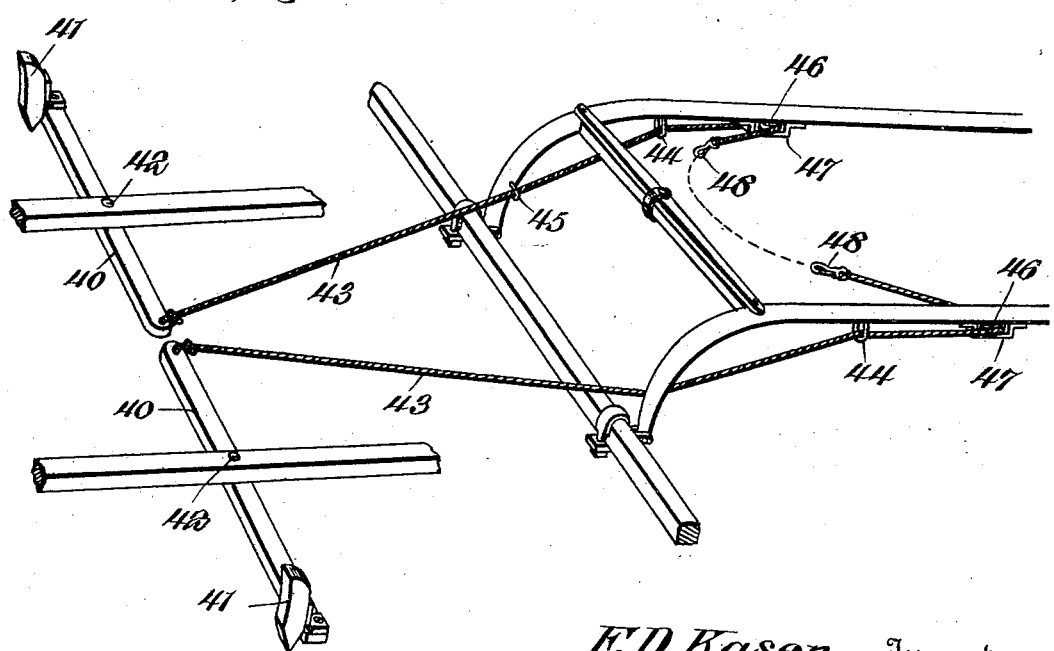
Witnesses
Howard D. Orr.
H. H. Riley
F. D. Kaser, Inventor,
By E. G. Siggers,
Attorney

UNITED STATES PATENT OFFICE.

FREDERICK D. KASER, OF SILVERTON, OREGON.

AUTOMATIC BRAKE FOR VEHICLES.

No. 931,430.　　　Specification of Letters Patent.　　　Patented Aug. 17, 1909.

Application filed July 17, 1908. Serial No. 444,042.

*To all whom it may concern:*

Be it known that I, FREDERICK D. KASER, a citizen of the United States, residing at Silverton, in the county of Marion and State of Oregon, have invented a new and useful Automatic Brake for Vehicles, &c., of which the following is a specification.

The invention relates to improvements in automatic brakes for various kinds of vehicles, and agricultural and other machines.

The object of the present invention is to improve the construction of automatic brakes for vehicles and agricultural and other machines, and to provide a simple, inexpensive and efficient brake, adapted to be automatically applied by the draft animals in holding back to check the forward movement while descending hills and other declivities, and capable of enabling a vehicle or machine to be readily backed when desired.

With these and other objects in view, the invention consists in the construction and novel combination of parts hereinafter fully described, illustrated in the accompanying drawings, and pointed out in the claims hereto appended; it being understood that various changes in the form, proportion, size and minor details of construction, within the scope of the claims, may be resorted to without departing from the spirit or sacrificing any of the advantages of the invention.

In the drawings:—Figure 1 is a plan view of a vehicle running gear provided with an automatic brake, constructed in accordance with this invention. Fig. 2 is a central longitudinal sectional view of the same. Fig. 3 is a perspective view of the rear portion of the running gear, illustrating the manner of mounting the brake beam and the transverse levers. Fig. 4 is a perspective view, illustrating the manner of applying the automatic brake mechanism to a single rig.

Like numerals of reference designate corresponding parts in all the figures of the drawings.

1 designates a transversely disposed brake beam, suspended by links 2 from a transverse supporting bar 3 and located beneath the rear portion of a reach 4 of a running gear at a point in advance of the hind wheels 5 and carrying brake shoes 6. The brake shoes 6, which are located at the rear edge of the brake beam in position for engaging the hind wheel at the front portions thereof, are connected with the ends of the brake beam 1 by means of hinges 7, having their leaves or members secured, respectively, to the upper face of the brake beam and to the front edges of the brake shoes. The pintles 8 of the hinges are located at the upper face of the brake beam and at points below the plane of the centers of the brake shoes, which, when the vehicle is backed, are thrown forwardly and upwardly out of engagement with the hind wheels by the upward movement of the front portions of the said wheels, whereby the automatic brake is prevented from interfering with the backing of the vehicle. The lower ends of the brake shoes are cut away at their rear sides and present downwardly and forwardly inclined lower edges $6^b$, which enables the lower shorter portion of the brake shoe to clear the hind wheel, when the brake shoes are swung forwardly while backing the vehicle. When the wheels rotate forwardly, the downward movement of the front portions of the hind wheels operate to maintain the brake shoes in their engaging position and prevent the brake shoes from swinging upwardly out of engagement with the said wheels.

The links 2, which are arranged to swing forwardly and rearwardly are connected at their lower ends to the brake beam at the upper face thereof by means of suitable eyes 9, which are linked into perforations of the lower ends of the links 2, as clearly illustrated in Fig. 3 of the drawings. The eyes 9 may consist of U-shaped fastening devices, piercing the brake beam and having threaded terminals for the reception of nuts 10 for engaging the lower face of the beam. Any other suitable fastening means, however, may be employed for connecting the brake beam to the lower ends of the links. The upper ends of the links 2 are provided with perforations for the reception of pivots 11 of angular hangers 12, secured to and depending from the ends of the supporting bar 3. The hangers 12, which are approximately L-shaped, consist of vertical depending portions and horizontal attaching portions, which are arranged upon the upper face of the supporting bar 3. The supporting bar 3 extends across and is secured to the front portions of the rear hounds 13 by means of vertical bolts 14, which also connect diagonal brace rods 15 with the running gear.

The diagonal brace rods 15, which converge forwardly from the rear axle, are suitably secured at their rear ends 16 to the same, and their front ends are provided with eyes through which the vertical bolts 14 pass, spacing sleeves 17 being preferably interposed between the brace rods and the rear hounds, as clearly shown in Fig. 3 of the drawings, but any other suitable means may be employed for connecting the front terminals of the brace rods with the running gear. The brace rods form supports for transversely disposed levers 18 and are provided with intermediate eyes 19 for the reception of bolts 20, which pierce the transverse levers 18 at points intermediate of the ends thereof and fulcrum the said levers to the brace rods. The outer ends of the levers 18 are provided with a plurality of perforations for the reception of the rear ends 21 of connecting links 22, provided at their front ends with eyes 23, which are linked into the eyes 9 of the brake beam. The links 22, which are disposed horizontally, extend rearwardly from the brake beam and their rear terminals are bent downwardly to engage the perforations 21, and are threaded for the reception of nuts 24, which retain the downwardly bent ends of the link 22 in the outer perforations of the levers 18.

The transverse levers 18, which are located at opposite sides of the reach, are also provided at their inner ends with a plurality of perforations 25 for the reception of pivots 26, which secure approximately U-shaped links or clips 27 to the inner ends of the transverse levers. The links or clips 27 are adjustable to vary the length of the inner arms, and the outer perforations permit the effective portions of the outer arms of the transverse levers to be varied in length.

The links 27, which converge forwardly, are secured to the rear end of a cable 28, extending from the said links to the front portion of the tongue 29, which is equipped with an upright lever 30. The running gear is provided at suitable points with guides 31 and 32 for the reception of the cable 28, but a chain, connecting rods, or any other form of connection may be employed for connecting the lower end of the upright lever 30 with the transverse levers 18. The guide 31, which is approximately U-shaped, depends from and is secured to the tongue at opposite sides thereof, and the other guide 32 is mounted on the front axle, being secured to the lower face thereof. The upright lever 30 is fulcrumed at an intermediate point on a bolt 33, which pierces a pair of metallic straps or bars 34, spaced apart to receive the lever 30 and extending forwardly from the front end of the tongue.

The straps or bars 34, which constitute a support for the upright lever, have their rear portions secured to the side faces of the tongue by transverse bolts 35, or other suitable fastening devices, which pierce the straps or bars and the tongue.

The upright lever 30 is provided at its upper and lower arms with perforations 36 and 37, the lower perforations 37 being adapted to receive the front end of the cable 28 and permitting the same to be adjustably connected with the lower arm of the lever 30. The perforations 36 of the upper arm of the lever are adapted to receive a chain, or other suitable flexible connection for connecting the upper arm of the lever with the neck yoke, whereby when the draft animals hold back to check the forward movement of the vehicle, the cable 28 will be drawn forward and will carry with it the inner arms of the transverse levers 18. This swings the outer arms of the transverse levers rearwardly and carries the brake shoes into engagement with the rear wheels. The brake is applied with a force varying with the resistance offered by the draft animals to the forward movement of the vehicle, and the leverage afforded by the levers enables the vehicle to be readily checked by the draft animals. The brake mechanism has a limited movement in applying the brake, and the movement in practice will be insufficient to carry the brake beam into engagement with the hind wheels, when the brake shoes are swung upwardly and forwardly while backing the vehicle.

In order to prevent the brake beam from twisting when the brake is applied, it is equipped at its center with an upwardly and forwardly extending arm 38, constructed of metal, or other suitable material and having its upper end normally located a short distance below the reach and arranged to engage the same to resist any upward movement of the arm. The greater portions of the rear faces of the brake shoes are located above the plane of the upper face of the brake beam, and by this arrangement of the brake shoes there is a tendency to tilt or rock the brake beam, when the brake is applied. The reach forms a stop for the arm 38 and prevents the brake beam from being materially rocked or twisted by the clamping action of the brake shoes on the hind wheels.

The upwardly extending arm 38 is normally held out of engagement with the reach by means of a coiled spring 39, extending rearwardly from the upper end of the arm to the reach and secured at its front end to the upper arm 38 and at its rear end to the reach. The coiled spring 39, which yieldably holds the brake shoes off the wheels when there is no pulling strain on the connection between the levers, is slightly compressed by the rearward movement of the arm 38 when the brake is applied, and it is adapted to expand and assist in throwing the brake shoes off the wheels when the brake is released by the draft animals. The forward rotation of the hind wheels by their rotation also operate to throw the brake shoes off from them after an application of the brake, and the said coiled spring returns the brake beam to its initial position, should the same be tilted forwardly while backing the vehicle.

The automatic brake is designed for use on various kinds of vehicles and various kinds of machines, such as agricultural machines, road graders, and the like, and it is also applicable to single rigs. In Fig. 4 of the drawings, which is a modification of the invention, the automatic brake is shown applied to a single rig, the running gear of which is equipped with a pair of transverse brake levers 40, carrying brake shoes 41 constructed and arranged similar to the brake shoes 6, heretofore described. The brake levers 40 are pivoted at an intermediate point by bolts 42, or other suitable fastening devices to side bars of the running gear, but they may be applied to any other convenient portion of the running gear of a single rig vehicle, as will be readily understood. The inner ends of the brake levers are connected to the rear terminals of the flexible connections 43, which may consist of cables, straps, or any other suitable flexible connections. These flexible connections extend forwardly from the brake levers, which are located in advance of the hind wheels of the single rig in position for the brake shoes 41 to engage the said hind wheels. The shafts are equipped with front and rear guides 44 and 45, and are provided with pulleys 46, mounted in suitable brackets or casings 47 and receiving the front portions of the flexible connections 43. The front terminals of the flexible connections 43 extend rearwardly from the pulleys and are equipped with snap hooks 48, or other suitable means for connecting them to the breeching of the harness, whereby when the horse, or other draft animal holds back, the brake will be applied through the flexible connections 43 by drawing the arms of the brake levers 40 forward and swinging rearwardly the outer arms, which carry the brake shoes.

Having thus fully described my invention, what I claim as new and desire to secure by Letters Patent, is:—

1. A brake including a transverse brake member, and a brake shoe arranged to engage the wheel in advance of the same and pivoted below its center directly to the brake member at the rear face thereof and bearing against the same, whereby an upward movement of the engaging portion of the wheel will swing the brake shoe forward, said brake shoe having its lower portion cut off at an angle at the rear face and presenting an inclined lower rear edge extending downwardly and forwardly from the engaging face of the brake shoe and adapted to enable the lower end of the latter to clear the wheel when the brake shoe is swung forwardly, and means for applying the brake.

2. A brake including a transverse brake beam, brake shoes carried by the beam, means connected with the beam for applying the brake, and an arm extending upwardly and forwardly from the brake beam and arranged to be carried into and out of contact with a portion of the running gear by the said operating means and adapted to prevent the brake beam from rocking or twisting when the brake is applied.

3. The combination with a running gear having a relatively fixed reach, of a transverse brake beam located beneath the reach, brake shoes hinged to the brake beam and extending above the same and arranged to be thrown forward by the upward movement of the wheels, means for operating the brake, and an arm projecting upward from the brake beam and movable into and out of contact with the reach by the said operating means and adapted to prevent the brake beam from twisting when the brake is applied.

4. A brake including a brake beam, brake shoes carried by the same, an arm extending upwardly and forwardly from the brake beam and arranged to engage a portion of a vehicle or machine to prevent the brake beam from twisting when the brake is applied, and yieldable means connected with the arm for holding the brake shoes normally out of engagement with the wheels.

5. A brake including a brake beam, brake shoes carried by the same, an arm extending upwardly and forwardly from the brake beam and arranged to engage a portion of a vehicle or machine to prevent the brake beam from twisting when the brake is applied, and a spring connected with the arm and arranged to be compressed when the brake is applied and adapted to assist in throwing the brake shoes off the wheels when the same are released.

6. A brake including a brake beam, brake shoes carried by the brake beam, an arm extending upwardly and forwardly from the brake beam and arranged to engage a portion of a vehicle or machine to prevent the brake beam from rocking or twisting rearwardly when the brake is applied, and a coiled spring located in rear of the arm and having its rear end fixed and connected at its front end to the said arm and arranged to hold the said arm normally out of engagement with the vehicle or machine and adapted to be compressed when the brake is applied and capable also of being distended by a forward movement of the brake beam beyond its normal position.

7. A brake including a transverse supporting bar, hangers secured to and depending from the terminals of the supporting bar and provided below the same with pivots, a brake beam provided with eyes, links depending from the said pivots and connected with the eyes of the brake beam, transverse levers fulcrumed at an intermediate point, links connected with the eyes of the brake beam and with the outer arms of the transverse levers, and operating mechanism connected with the inner ends of the transverse levers.

8. In a brake, the combination with a running gear including a rear axle and rear hounds, of a transverse supporting bar mounted on the running gear and projecting beyond the rear hounds, diagonal braces located beneath the rear hounds and secured at their rear ends to the running gear, fastening means piercing the running gear and the supporting bar and connected to and supporting the front ends of the diagonal braces, a brake beam suspended from the supporting bar, transverse levers fulcrumed at an intermediate point on the diagonal braces and connected at their outer ends with the brake beam, and operating mechanism connected with the inner arms of the transverse levers.

9. In a brake, the combination of a running gear, a brake beam suspended from the running gear in advance of the hind wheel, brake shoes hinged to the brake beam and arranged to swing upwardly over the same, transverse levers located in rear of and connected with the brake beam, an upright lever mounted at the front of the tongue, connecting means extending from the front lever to the transverse levers, a centrally arranged arm extending upwardly and forwardly from the brake beam and arranged to engage the reach, and a spring connected with the running gear and with the arm.

In testimony, that I claim the foregoing as my own, I have hereto affixed my signature in the presence of two witnesses.

FRED. D. KASER.

Witnesses:
M. J. VAN VALKENBURG,
G. A. WEBB.